July 20, 1926.

E. G. McDONALD

BRAKE OPERATING MECHANISM

Filed March 20, 1926

1,593,219

INVENTOR
EUGENE G. McDONALD
BY
ATTORNEY

Patented July 20, 1926.

1,593,219

UNITED STATES PATENT OFFICE.

EUGENE G. McDONALD, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed March 20, 1926. Serial No. 96,165.

This invention relates to operating mechanism for brakes, and is illustrated as embodied in an automobile chassis having brakes on all four wheels. An object of the invention is to increase the strength and rigidity of the connections by balancing the forces and by the novel use of a supporting member to serve as a strut or spacing member between two cross shafts.

In one desirable arrangement the cross shafts are arranged along opposite sides of a cross member of the chassis frame, preferably supported by novel brackets on the frame member, while a supporting member carried at its ends by the shafts serves to support a lever operated by the driver and connected to the shafts. In offsetting the supporting member to clear the cross frame member, I prefer to bring it approximately in line with the ends of operating arms on the shafts, and to connect the lever to the arms respectively on opposite sides of its fulcrum.

An important minor feature of novelty relates to securing the two brackets by a bolt passing through a rigid spacer inside the channel of the frame member.

The above and other objects and features of the invention, including various novel combinations of parts and desirable particular constructions, will be apparent from the following description of one illustrative embodiment shown in the accompanying drawing, in which.

Figure 1:
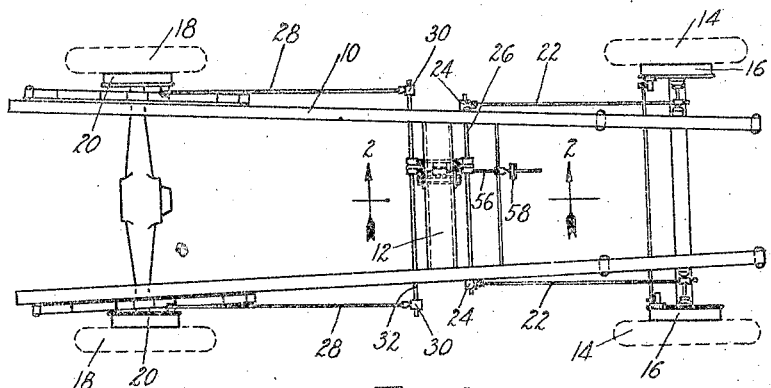
Fig. 1 is a top plan view of the chassis.
Figure 2:
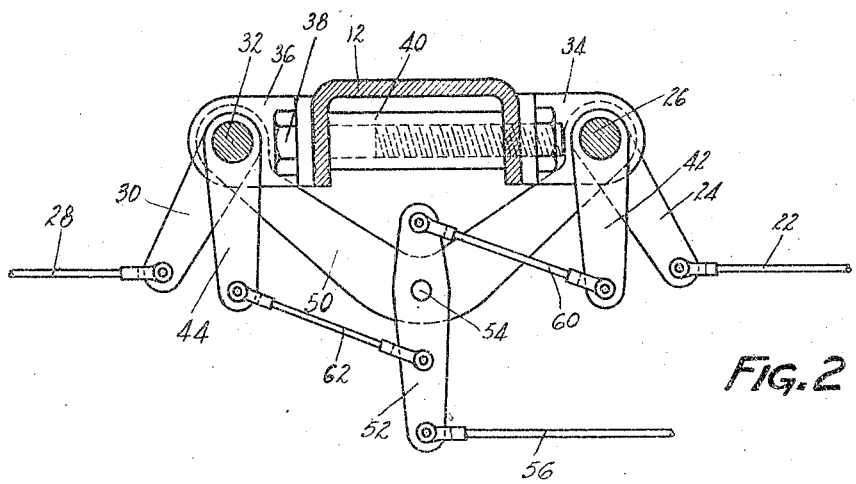
Fig. 2 is a section on the line 2—2 of Fig. 1, showing the lever and arms in side elevation.

The particular chassis illustrated includes a chassis frame 10 having a channel-section cross member 12, front wheels 14 having brakes 16, and rear wheels 18 having brakes 20. Front brakes 16 are operated by links 22 connected to arms 24 extending downwardly from a cross shaft 26, while rear brakes 20 are operated by links 28 connected to arms 30 extending downwardly from the ends of a cross shaft 32. Shafts 26 and 32 extend along opposite sides of the cross frame member 12.

Preferably the shafts are supported in part by L-shaped brackets 34 and 36 secured to frame member 12 by one or more bolts 38, each passing through a rigid spacer 40 inside the channel of the frame member. On the same sides of these brackets, in this particular arrangement, downwardly-extending operating arms 42 and 44 are secured respectively to the shafts 26 and 32.

On the opposite sides of the brackets there are sleeved or otherwise carried the ends of a rigid supporting member 50, bowed or offset downwardly, to clear cross frame member 12, approximately in line with the ends of the operating arms 42 and 44. At the center of member 50 a vertical lever 52 is pivoted on a fulcrum 54; the lower end of lever 52 is connected by a link 56 to the service brake pedal 58 operated by the driver. The upper end of lever 52 is connected by a link 60 to the end of arm 42, while preferably approximately midway between fulcrum 54 and link 56 it is connected by a link 62 to the end of arm 44. It will be observed that member 50 has the double function of carrying lever 52 and of bracing the shafts apart to prevent flexing when the brakes are applied.

While one illustrative embodiment has been described in detail, it is not my intention to limit its scope to that particular embodiment, or otherwise than by the terms of the appended claims.

I claim:

1. An automobile chassis including a frame and brake mechanism including a pair of cross shafts, the frame including a channel-section cross member between the shafts, and comprising, in combination therewith, a pair of brackets supporting portions of the shafts and mounted on opposite sides of the cross member, a spacer in the cross member between the brackets, and a bolt passing through the brackets and the cross member and the spacer and fastening them rigidly together.

2. An automobile chassis including brakes and a pair of cross shafts applying the brakes, and comprising, in combination therewith, a supporting member sleeved at its ends on the shafts, a lever pivotally mounted on said supporting member between the shafts and connected on opposite sides of the member with the respective shafts, and operating connections for rocking said lever to apply the brakes.

3. An automobile chassis including brakes and a pair of cross shafts applying the brakes, and comprising, in combination therewith, a supporting member sleeved at its ends on the shafts, a lever having a fulcrum on said supporting member between the shafts and connected on opposite sides of the member at points substantially equidistant from the fulcrum with the respective shafts, and a driver-operated member connected to the lever at a point substantially double the distance from the fulcrum of one of said shaft connections.

4. An automobile chassis including a cross frame member and brake-operating shafts on opposite sides of said frame member, and comprising, in combination therewith, an operating arm on each shaft extending beyond the frame member, a supporting member carried at its ends on the shafts adjacent said arms and bowed to clear the frame member to a position approximately in line with the ends of the arms, a generally vertical double-arm lever fulcrumed approximately at the center of the supporting member, a link connecting one arm to the lever above its fulcrum, and a link connecting the other arm to the lever below its fulcrum.

5. An automobile chassis including a pair of brake-operating shafts, and comprising, in combination therewith, an operating arm on each shaft, a supporting member carried at its ends on the shafts adjacent said arms, a generally vertical double-arm lever fulcrumed approximately at the center of the supporting member, a link connecting one arm to the lever above its fulcrum, and a link connecting the other arm to the lever below its fulcrum.

6. An automobile chassis including a cross frame member, a pair of shafts arranged one along each side of the frame member and each of which has brake-operating arms at its ends, and comprising, in combination therewith, brackets on opposite sides of the frame member supporting the shafts, operating arms on the shafts immediately adjacent the brackets, a supporting member carried at its ends on the shafts on the opposite sides of the brackets from the operating arms, a lever fulcrumed approximately at the center of the supporting member, and connections from the lever on opposite sides of its fulcrum to said operating arms respectively.

7. An automobile chassis including a cross frame member, a pair of shafts arranged one along each side of the frame member and each of which has brake-operating arms at its ends, and comprising, in combination therewith, operating arms on the shafts, a supporting member carried at its ends on the shafts and centrally offset to clear the frame member approximately in line with the ends of said arms, a lever fulcrumed approximately at the center of the supporting member, and connections from the lever on opposite sides of its fulcrum to said operating arms respectively.

In testimony whereof, I have hereunto signed my name.

EUGENE G. McDONALD.